United States Patent Office 3,479,051
Patented Nov. 18, 1969

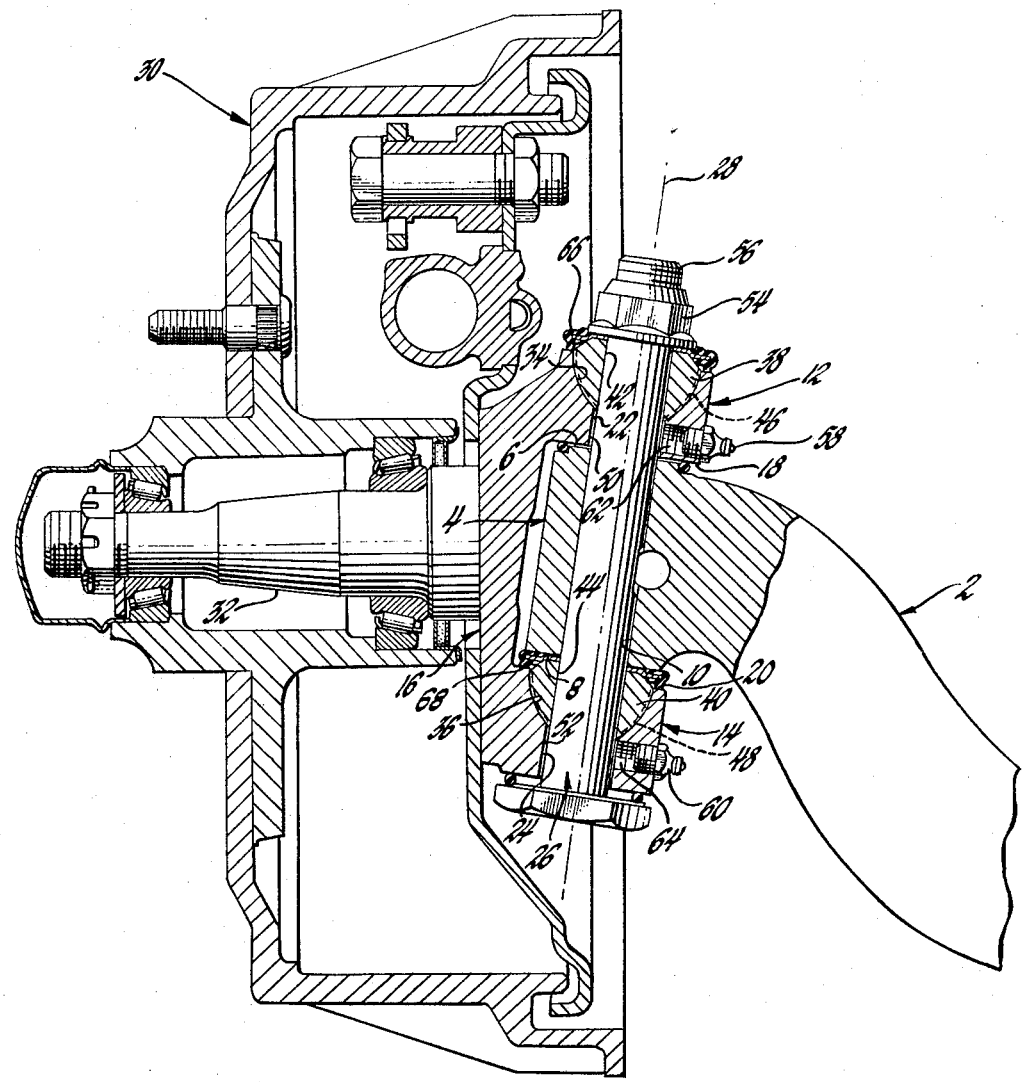

---

3,479,051
SPHERICAL BEARING KING PIN STEERING KNUCKLE ASSEMBLY
Irwin K. Weiss, Birmingham, Mich., assignor to General Motors Corporation, Detroit, Mich., a corporation of Delaware
Filed Jan. 11, 1968, Ser. No. 697,149
Int. Cl. B62d 7/18, 7/06
U.S. Cl. 280—96.1                          5 Claims

ABSTRACT OF THE DISCLOSURE

A king pin type steering knuckle assembly for a vehicle axle in which semi-spherical bearing portions are arranged around a king pin in vertically spaced relation for engagement with cooperating vertically spaced sockets formed in a knuckle, the bearing portions and associated sockets at each end being oriented so that load imposed on the axle effects compressive loading of one, while compressive loading of the other is selectively adjustable by means associated with the king pin.

---

This invention relates to steering knuckle assemblies and particularly to assemblies of the type providing dirigible mounting of a wheel relative to a solid axle.

In trucks and other heavy duty vehicles, the front wheels are commonly dirigibly mounted on solid or beam type axles by what is commonly known as a "Reverse Elliott" steering knuckle assembly in which bifurcated inner portions of the wheel knuckle overlap the terminal end of the axle and are connected thereto by a king pin passing through vertically aligned apertures in the axle and overlapping portions. While this basic type of construction has proved to be both simple and rugged, optimum results depend upon initial establishment of relatively fine tolerances. Additionally, due to the heavy duty to which such vehicles are subjected, maintenance of such tolerances is an equally important consideration.

An object of the invention is to provide an improved king pin type steering knuckle assembly.

Another object is to provide an assembly of the stated character which is not only simple and economical to manufacture, assemble and disassemble, but is also durable and readily adjustable for wear compensation.

A further object is to provide an arrangement of the stated character incorporating means for establishing and maintaining a definite preload enabling accurate frictional control of steering effort.

The foregoing and other objects, advantages and features of the invention will become more readily apparent as reference is had to the accompanying specification and single sheet of drawings wherein there is illustrated a wheel knuckle assembly incorporating the invention.

In the drawing, the reference numeral 2 generally designates a transversely disposed drop center beam type front axle commonly utilized in heavy duty vehicles. It will be understood that the axle 2 is symmetrical and accordingly the foregoing description relating to one end of the axle applies equally to the opposite end of the axle, not shown. At its terminal end, axle 2 is formed with a cylindrical portion 4 having parallel upper and lower surfaces 6 and 8 and a vertically extending bore 10. Overlapping surfaces 6 and 8 are vertically spaced inwardly extending bosses 12 and 14 formed integrally on a wheel knuckle 16. At their vertically opposed inner faces, bosses 12 and 14 are formed with flat surfaces 18 and 20 spaced to provide clearance with surfaces 6 and 8. Bosses 12 and 14 are also formed with aligned apertures 22 and 24 which in turn are aligned with bore 10 in axle 2. A king pin 26, in the form of a threaded bolt, passes vertically through each of the aligned apertures and is keyed in the latter bore to provide a steering axis 28 for the wheel 30 mounted rotatably on the spindle portion 32 of knuckle 16.

In order to provide optimum initial precision bearing engagement between knuckle 16 and axle 2 in accordance with one feature of the invention, the upper ends of bosses 12 and 14 are formed with machined semi-spherical sockets 34 and 36 which effect precision bearing engagement with apertured semi-spherical bearing elements 38 and 40, which in turn are formed with vertically extending apertures 42 and 44 adapted for precision sliding fit with king pin 10. Bearing elements 38 and 40 are preferably formed of sintered iron and include lubricant recesses 46 and 48 formed on the spherical outer surfaces thereof. Inasmuch as the effective bearing engagement establishing the steering axis 28 is accomplished by mating engagement of the outer and inner semi-spherical surfaces of socket 34 and bearing elements 38, and socket 36 and bearing element 40, any need for precision fit between the king pin 10 and the portions of bosses 12 and 14 adjacent their respective sockets is eliminated. Accordingly, small annular reliefs 50 and 52 are provided. When arranged in the manner described, the bearing engagement effected is not only highly precise, but additionally automatically accommodates slight variations in vertical alignment between the parts associated with the king pin, in contrast to the conventional arrangement wherein even slight deviation introduces varying degrees of binding and undesirable stress.

According to another feature of the invention, the bearing elements and their respective sockets are oriented in relation to the load imposed on the axle so that the lower bearing and socket are compressively loaded as a function of load on the vehicle, while the upper bearing and socket are selectively preloaded by adjustably tightening the nut 54 on the threaded upper end 56 of king pin 26. Because of this arrangement, precise establishment of a desired degree of preload on the upper bearing assembly is readily accomplished thus enabling selection of a degree of resistance to dirigible movement of the vehicle providing the desired steering effort. Inasmuch as gradual wear experienced between the lower bearing element and its socket is automatically taken up by the constant load imposed thereon, original precision fit is maintained. Similarly, any wear experienced between the upper bearing and its socket is readily removed by tightening the nut 54 to restore both the initial precision fit and the preload, as previously mentioned.

In addition to the above advantages, a construction in accordance with the present invention effectively eliminates the need for conventional thrust bearings, due to the fact that the semi-spherical bearing elements 38 and 40 perform the dual function of absorbing both side loads and thrust loads.

In order to accomplish effective and efficient lubrication of the bearings, grease fittings 58 and 60 are threadably installed in transverse bores 62 and 64 formed in upper and lower bosses 12 and 14 adjacent the reliefs 50 and 52, thereby utilizing the relief portions as lubricant passages into the recesses 46 and 48. Annular grease seals 66 and 68 disposed respectively between the lower face of nut 54 and adjacent face of boss 12, and the lower face of axle 2 and adjacent face of boss 14 prevent dissipation of lubricant contained between the bearing surfaces.

While but one embodiment of the invention has been shown and described, it will be apparent that other changes and modifications may be made therein.

I claim:
1. A king pin assembly comprising, a wheel knuckle having vertically spaced projections formed with aligned apertures, an axle having an end portion disposed between said projections formed with an aperture aligned with said first mentioned apertures, means forming a pair of semi-spherical sockets in said projections concentric with said apertures and facing in a common direction, a pair of semi-spherical bearing elements disposed in said sockets, means forming apertures in said bearing elements aligned with said first and second mentioned apertures, a king pin extending through all of said apertures in precision engagement therewith, and means on one end of said king pin adapted to directly compressively load one of said bearing elements relative to its socket, the other of said bearing elements being compressively loaded as a function of load on said axle.

2. The invention of claim 1 wherein said king pin is threaded at one end and formed with a shouldered head portion at the other end, and said last mentioned means comprises a nut threadably engaging said threaded end.

3. The invention of claim 1 wherein said means on one end of said king pin compressively loads the upper of said bearing elements.

4. The invention of claim 1 wherein said bearing elements are formed with flat thrust surfaces normal to the axis of said king pin.

5. The invention of claim 4 including annular seal means surrounding said bearing elements in the plane of said thrust surfaces.

References Cited

UNITED STATES PATENTS

| | | | |
|---|---|---|---|
| 1,396,324 | 11/1921 | Gieske | 287—100 |
| 1,483,282 | 2/1924 | Coston | 280—96.1 |
| 1,689,750 | 10/1928 | Redfield. | |
| 3,288,485 | 11/1966 | White et al. | 280—96.1 |
| 3,342,507 | 9/1967 | Koch et al. | 280—96.1 |

KENNETH H. BETTS, Primary Examiner

U.S. Cl. X.R.

287—100; 308—72 120